United States Patent [19]

Fujimoto et al.

[11] Patent Number: 4,671,915

[45] Date of Patent: Jun. 9, 1987

[54] METHOD FOR MAKING A GLASS PRECISION VALVE

[75] Inventors: Keiji Fujimoto, Kobe, Japan; Reinhard Thom, Schwendenerstrasse 25-a, 1000-Berlin 33, Fed. Rep. of Germany

[73] Assignees: TOA Medical Electronics Company Limited, Japan; Reinhard Thom, Fed. Rep. of Germany

[21] Appl. No.: 781,728

[22] Filed: Sep. 30, 1985

[51] Int. Cl.⁴ ............... B29C 39/10; B29C 39/08; B24B 15/04; F16K 5/16

[52] U.S. Cl. ............................ 264/162; 51/283 R; 51/290; 51/326; 137/246.21; 137/246.22; 137/250; 137/251.1; 251/309; 251/314; 251/332; 251/368; 251/900; 264/267; 264/311

[58] Field of Search ............... 264/162, 267, 310, 311; 251/309, 314, 337, 332, 900, 368, DIG. 1, 368; 137/250, 251.1, 246.21, 246.22, 540; 51/283, 290, 326

[56] References Cited

U.S. PATENT DOCUMENTS

| | | | |
|---|---|---|---|
| 911,809 | 2/1909 | Conradson | 51/283 |
| 914,244 | 3/1909 | Conradson | 51/283 |
| 2,083,228 | 6/1937 | Geyer | 251/368 X |
| 2,154,574 | 4/1939 | Martin | 251/368 X |
| 2,427,849 | 9/1947 | Garwood | 51/233 X |
| 2,589,985 | 3/1952 | Borneman | 251/368 X |
| 2,648,179 | 8/1953 | Manes et al. | 51/283 |
| 2,995,057 | 8/1961 | Nenzell | 251/332 X |
| 3,269,696 | 8/1966 | Norton | 251/368 X |
| 3,293,342 | 12/1966 | Grove | 264/267 X |
| 3,444,281 | 5/1969 | Cahill et al. | 264/311 X |
| 3,577,486 | 5/1971 | Sebok | 264/310 X |
| 3,580,275 | 5/1971 | Hanson et al. | 137/540 X |
| 3,628,294 | 12/1971 | Sattler et al. | 51/283 |
| 3,756,273 | 9/1973 | Hengesbach | 137/540 |
| 3,861,646 | 1/1975 | Douglas | 264/267 X |
| 3,904,718 | 9/1975 | Kuehn, Jr. | 264/267 X |
| 3,945,396 | 3/1976 | Hengesbach | 137/540 X |
| 4,011,692 | 3/1977 | Bos et al. | 51/283 X |

FOREIGN PATENT DOCUMENTS

| | | | |
|---|---|---|---|
| 57-100024 | 6/1982 | Japan | 264/311 |
| 840559 | 7/1960 | United Kingdom | 251/DIG. 1 |

Primary Examiner—Philip Anderson
Attorney, Agent, or Firm—Barnes & Thornburg

[57] ABSTRACT

A glass precision valve for use in liquid measuring instruments, the valve comprising a valve body having a conically sharpened head slidably accommodated in a bulged portion, which includes glass tubes at opposite ends, a valve seat provided by the inside wall of the bulged portion, the surface of the valve seat allowing the conically sharpened head of the valve body to be slidable in a liquid-tight manner, and the valve body including a ring-shaped groove around its axis, the ring-shaped groove being filled with an elastic material.

2 Claims, 21 Drawing Figures

METHOD FOR MAKING A GLASS PRECISION VALVE

BACKGROUND OF THE INVENTION

1. Field of the Invention

The present invention relates to a glass precision valve for use in combination with liquid measuring instruments, and methods for making the same, wherein the valve means is a unit including a valve body and a valve seat adapted to allow the valve body to slide thereon. As its name implies, the glass precision valve must be especially watertight so as to keep the testing or measuring liquid pure or fresh.

2. Description of the Prior Art

In order to fully describe the background of the invention, reference will be made to FIGS. 16 to 20:

A liquid specimen is often observed through a transparent receptacle, in which the specimen is watertightly contained. The common practice is illustrated in its simplest form in FIG. 16. The reference numeral 1 denotes a glass tubular receptacle which has check valves 2 and 3 at the inlet and the outlet, respectively. The specimen 4 flows from the inlet to the outlet through the two check valves 2, 3. In this example, the check valves 2, 3 must be carefully constructed so as not to cause a leakage.

For such use there are many types of precision valves available in the market, but they are not satisfactory because of the following disadvantages:

1. The example shown in FIG. 17 uses an electromagnet for moving a valve body 5 in a space 6. Many valve bodies are made of elastic substance, such as rubber. Because of the elastic body of the valve the capacity of the space varies. Another disadvantage is that a source of power is required for operating the valve 5.

2. The example shown in FIG. 18 uses a glass valve 7, which moves in a glass receptacle. Because of the glass construction of the two members they keep watertight contact with each other, but when the rotary valve body 7 is to be smoothly rotated, it will be required to apply a lubricant 8, such as silicone grease, interfacially. The use of a lubricant is likely to contaminate the specimen when it is introduced in the receptacle.

3. The example shown in FIG. 19 uses a valve 12 made of other material than metal. To produce a confined space the common practice is to connect between a glass tube 11 and a valve tube 13 by means of an elastic tube 10. Here a gap 14 is disadvantageously produced, which varies the capacity of the confined space. In addition, the specimen is in danger of contamination with the previously used liquid.

4. The example shown in FIG. 20 uses an O-ring 15 for a sealer. However, this also leads to the detrimental variation of the capacity of the confined space. Even when the variation is slight, it will not be negligible when the capacity is small. In addition, the O-rings and the valve seat are in contact on points, and a foreign matter is likely to gather, thereby hampering the smooth movement of the valve body.

Referring to FIGS. 3 and 6, the conventional method of producing a glass precision valve will be described:

A drill 16 having a conically sharpened head is rotated at a high speed, wherein the head is coated with diamond powder. In FIGS. 3 and 4, the rotating drill 16 is approached to the glass rod 17 which is also rotated at a high speed. Likewise, the rotating, drill 16 is caused to enter a valve casing having a rotating glass bulged portion 20 until it comes into contact with the bottom thereof. The bulged portion 20 has a glass tube 18. As shown in FIG. 6, the drill 16 grinds the inside surface of the glass tube 18, thereby producing a valve seat 22. The valve body 21 is produced from the glass rod 17 as mentioned above. The finished valve body and seat are mutually rubbed with the use of fine diamond powder 23 interfacially placed therebetween, so as to enhance the liquid-tightness therebetween. The degree of the liquid-tightness is controlled by the grain size of the diamond powder used at the final stage. FIGS. 7 and 8 illustrates this operation.

This conventional practice is commonly called a grinding method, and it is widely used. However, this practice causes the above-mentioned drawbacks, particularly the problem of contamination. A further disadvantage is that the valve body tends to stick to the valve seat through repeated use, thereby reducing the working efficiency.

OBJECTS AND SUMMARY OF THE INVENTION

The present invention aims at solving the difficulties pointed out above, and has for its object to provide a glass precision valve operable with the minimum force regardless of the fact that the valve body constantly keeps liquid-tight contact with the valve seat.

Another object of the present invention is to provide a method of making a glass precision valve in an economically short time.

Other objects and advantages of the present invention will become more apparent from the following description when taken in conjunction with the accompanying drawings which show, for the purpose of illustration only, one embodiment in accordance with the present invention.

According to one aspect of the present invention, there is a glass precision valve for use in liquid measuring instruments, the valve comprising:

a valve body having a conically sharpened head slidably accommodated of a valve casing, which includes glass tubes at opposite ends;

a valve seat provided by the inside wall of the valve casing, the surface of the valve seat allowing the conically sharpened head of the valve body to slide in a liquid-tight manner; and the valve body including a ring-shaped groove around its axis, the ring-shaped groove being filled with an elastic material.

According to another aspect of the present invention, there is a method for making a glass precision valve, the method comprising:

rotating a conically sharpened drill coated with diamond powder at a hight speed;

placing the rotating drill into contact with a glass rod and an inside surface of a valve casing, the rod and the casing being rotated at a high speed, thereby grinding them into a valve body having a conically sharpened head, and a valve seat adapted to allow the valve body to slide thereon, respectively, wherein the valve casing has glass tubes at opposite sides;

rubbing the valve body and the valve seat with diamond powder interfacially placed, thereby enhancing the liquid-tightness therebetween;

resuming to rotate the valve body at a high speed, and placing a metal wire coated with diamond powder into contact with the conically sharpened head thereof, thereby producing a ring-shaped groove around its axis;

filling the ring-shaped groove with a liquid elastic substance while the valve body is in rotation; and removing a portion of the elastic substance which protrudes from the periphery of the groove.

DETAILED DESCRIPTION OF THE PREFERRED EMBODIMENT

Figure 3:
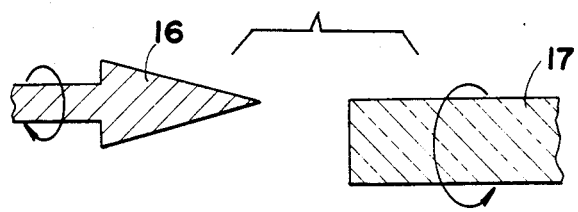
FIGS. 3 to 8 are schematic views showing the steps of making a valve body and a valve seat according to the well-known method.
Figure 4:
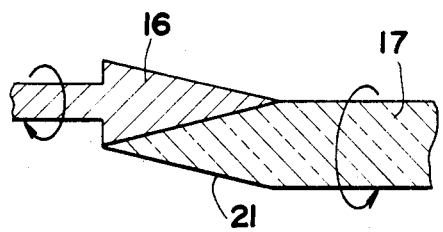
Figure 5:
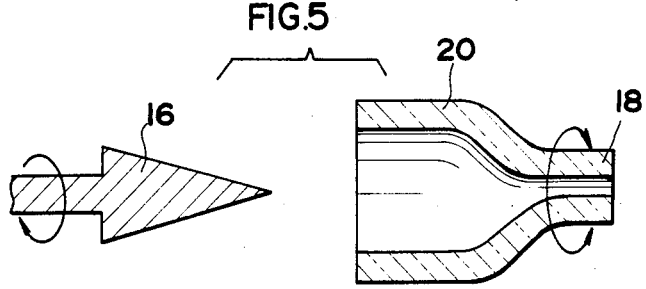
Figure 6:
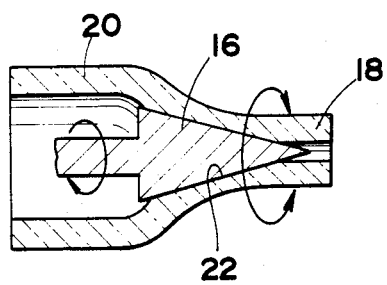
Figure 7:
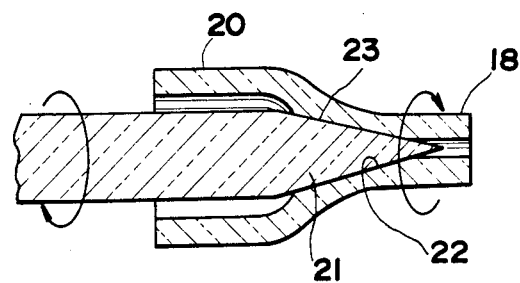
Figure 8:
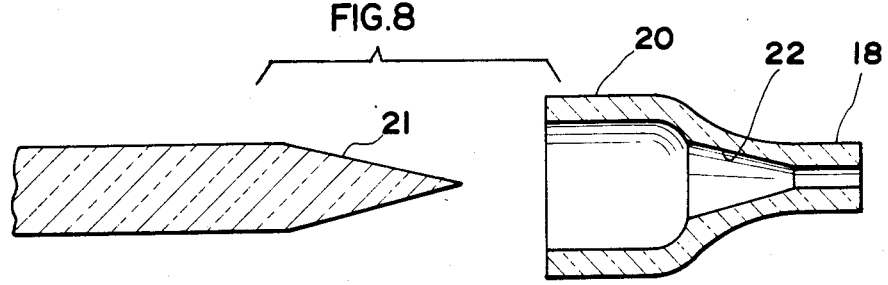
Figure 9:
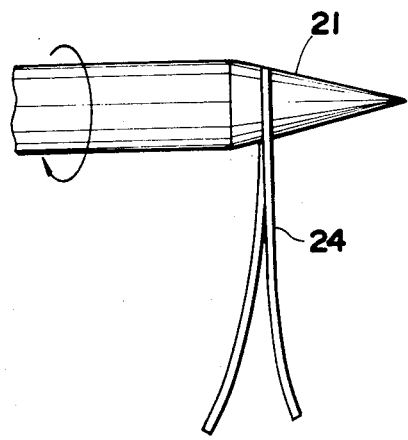
FIGS. 9 to 12 are schematic views showing the steps of producing a ring-shaped groove on the valve body, and filling it with elastic material.
Figure 10:
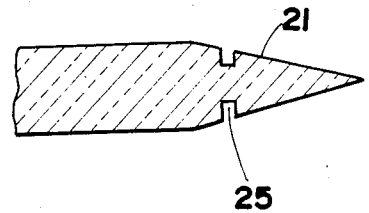
Figure 11:
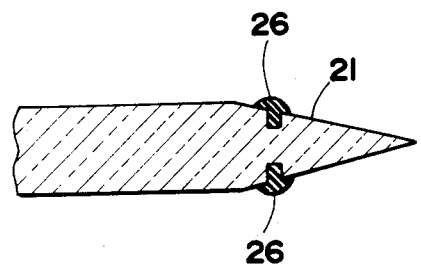
Figure 15:
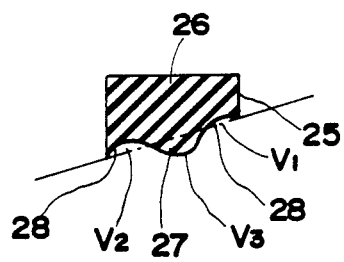
FIG. 15 is a schematic view on an even larger scale of the portion shown in FIG. 14.
Figure 16:
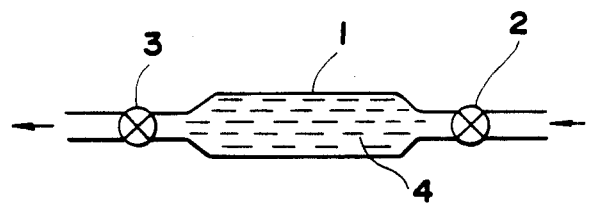
FIG. 16 is a schematic view showing an operating state of a conventional glass precision valve.
Figure 17:
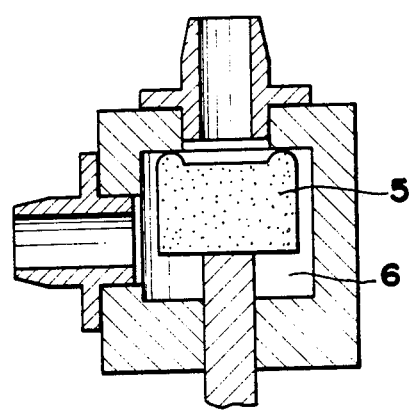
FIGS. 17 to 20 are schematic views exemplifying conventional glass precision valves.
Figure 18:
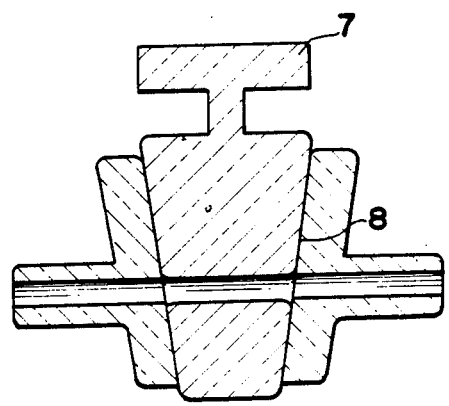
Figure 19:
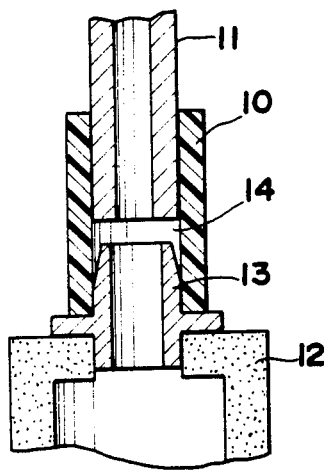
Figure 20:
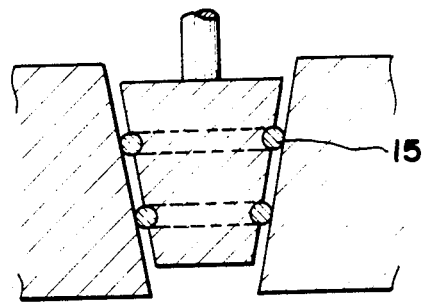

Referring to FIGS. 3 and 15, an example of the preferred embodiment will be described:

As described above with reference to FIGS. 3 to 8, the glass precision valve as a unit includes a valve casing, a valve body 21 slidable in the casing and a valve seat 22 along which the valve body slides. The valve casing includes a cylindrical bulged portion 20. The valve body 21 and the valve seat 22 are roughly shaped at first by means of a rotating drill 16 having diamond powder coated thereon. The valve body 21, particularly its conically sharpened head, and the valve seat 22 formed on the inside surface of the bulged portion 20 of the casing, are mutually rubbed with finer diamond powder interfacially placed therebetween. In this way the valve seat 22 is formed, which has a seat surface for allowing the conically sharpened head of the valve body to slide thereon in a liquid-tight manner. The valve body 21 consists of a conically sharpened head and a cylindrical shank, wherein the conically sharpened head plays an important role in the present invention. The valve body 21 is rotated at a high speed as shown in FIG. 9, with a metal wire 24 placed on the conically sharpened head. The metal wire is coated with diamond powder. FIG. 10 shows a resulting groove 25 dug around the axis of the valve body 21. The width of the groove is equal to that of the metal wire 24.

When the groove of a broader width is wanted, a metal band can be used in place of the wire.

Figure 12:
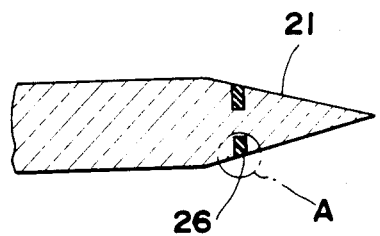
Figure 13:
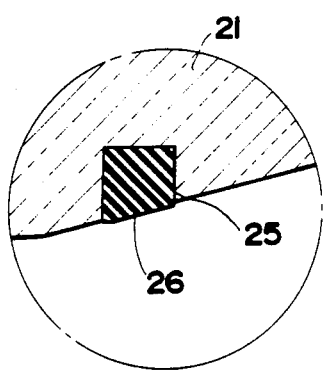
FIGS. 13 and 14 are schematic views on a larger scale of different phases of the portion indicated by the circle (A) in FIG. 12.

While the valve body 21 is further rotated, an elastic substance 26 of low viscosity and capable of polymerization at a room temperature, such as silicone rubber, is applied in the groove 25 until it is filled. Before the silicone rubber 26 hardens, a portion of the silicone rubber which extrudes from the periphery of the groove 25 is removed, so as to shape it into the state shown in FIGS. 12 and 13. This is almost the same as the state in which an O-ring of silicone rubber is fitted in the groove.

Figure 14:
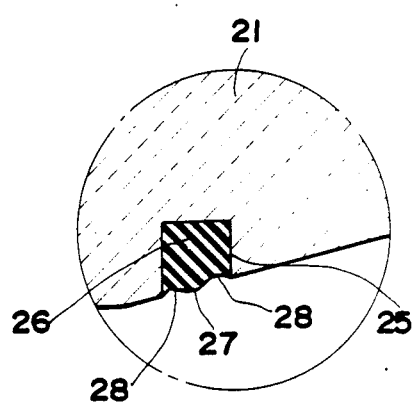
Figure 21:
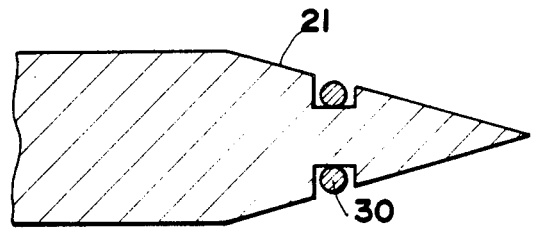
FIG. 21 is a schematic view showing a conventional valve body having an O-ring fitted therein.

Then, the valve body 21 is again rotated at such an adjusted speed that a convex portion 27 in the central zone and concave portions 28 at side zones are produced under centrifugal action, as shown in FIGS. 14 and 15. In this case, the volume $V_3$ of the convex portion 27 is equal to the sum of the volumes $V_1$ and $V_2$ of the concave portions 28; that is, $V_3 = V_1 + V_2$. The convex portion 27 can have various heights by controlling the speed of rotation, which affects the strength of centrifugal force. Thus a desired height of the convex portion can be produced. As shown in FIG. 21, in the prior art valve using an O-ring 30 the gap between the valve body 21 and the O-ring 30 is likely to clog or become dirty, but under the present invention this risk has been eliminated.

Figure 1:
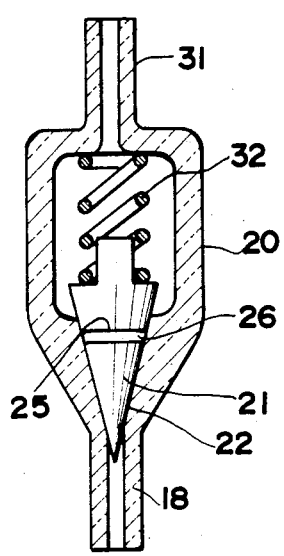
FIG. 1 is a schematic cross-section showing a glass precision valve embodying the present invention.

FIG. 1 shows a finished precision glass valve unit including the valve body 21 and the valve seat 22 embodying the present invention. As evident from the drawing, glass tubes 18 and 31 are provided axially of bulged portion 20 in which the conical valve body 21 is accommodated in such a manner that it is slidable therein. Throughout the sliding movement the valve body 21 is kept in liquid-tight contact with the valve seat 22 by means of a coil spring 32. The valve body 21 includes the ring-shaped groove 25 having silicone rubber 26 packed therein.

Figure 2:
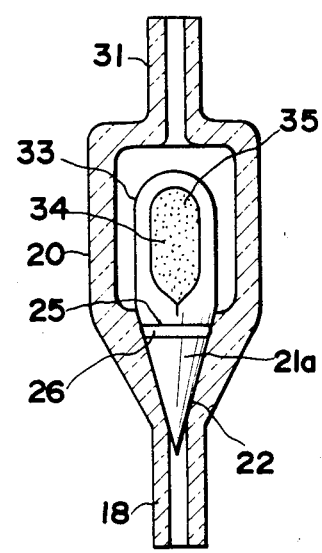
FIG. 2 is a schematic cross-section showing a modified version of the glass precision valve of FIG. 1.

FIG. 2 shows a modified version of the valve unit in which the coil spring is not used. This version is adapted for use where the liquid does not allow the use of a spring. The valve body 21a includes a hollowed body 33, which has a hollow section 34 in which metal powder 35 is confined, so as to give a weight to the valve body 21a. The kind and amount of the metal powder 35 are adjusted in accordance with a desired strength with which the valve body 21a is opened or closed. Except for the hollow structure of the valve body, the whole structure thereof is identical to that of the example shown in FIG. 1.

According to the present invention, the glass precision valve secures liquid-tightness effective to prevent the air mobility in the valve, and obviates the difficulty of valve mobility. According to the method of the invention, glass precision valves can be produced on a simplified process; thereby reducing the production cost.

What is claimed is:

1. A method for making a glass precision valve, the method comprising:

rotating a conically sharpened drill coated with diamond powder at a high speed;

placing the rotating drill into contact with a glass rod, the glass rod being rotated at a high speed, thereby grinding the rod into a valve body having a conically sharpened head, and also placing the rotating drill into contact with an inside surface of a valve casing, the valve casing being rotated at a high speed, thereby grinding the inside surface of the valve casing into a valve seat allowing the sharpened valve head to slide thereon, said valve casing having tubes at opposite ends;

rubbing the valve body and the valve seat with finer diamond powder interfacially placed, thereby enhancing the liquid-tightness therebetween;

rotating the valve body at a high speed, and placing a metal wire coated with diamond powder into contact with the rotating conically sharpened head, thereby producing a ring-shaped groove around its axis;

filling the ring-shaped groove with a liquid elastic substance while the valve body is in rotation; and removing a portion of the elastic substance which protrudes from the periphery of the groove.

2. A method for making a glass precision valve, the method comprising:

rotating a conically sharpened drill coated with diamond powder at a high speed;

placing the rotating drill into contact with a glass rod, the glass rod being rotated at a high speed, thereby grinding the rod into a valve body having a conically sharpened head, and also placing the rotating drill into contact with an inside surface of a valve casing, the valve casing being rotated at a high speed, thereby grinding the inside surface of the valve casing into a valve seat allowing the sharpened valve head to slide thereon, said valve casing having tubes at opposite ends;

rubbing the valve body and the valve seat with finer diamond powder interfacially placed, thereby enhancing the liquid-tightness therebetween;

rotating the valve body at a high speed, and placing a metal wire coated with diamond powder into contact with the rotating conically sharpened head, thereby producing a ring-shaped groove around its axis;

filling the ring-shaped groove with a liquid elastic substance while the valve body is in rotation;

removing a portion of the elastic substance which protrudes from the periphery of the groove; and resuming to rotate the valve body so that the central portion of the elastic substance placed in the ring-shaped groove becomes convex and that the opposite side portions thereof become concave under centrifugal action.

* * * * *